United States Patent
Yasui et al.

[11] Patent Number: 6,050,021
[45] Date of Patent: Apr. 18, 2000

[54] LINE INTRODUCTION GUIDE FOR PASS-THROUGH FISHING ROD

[75] Inventors: Toshihiko Yasui, Tondabayashi; Hiroshi Hashimoto, Sakai, both of Japan

[73] Assignee: Shimano Inc., Sakai, Japan

[21] Appl. No.: 08/922,603

[22] Filed: Sep. 3, 1997

[30] Foreign Application Priority Data

Sep. 6, 1996 [JP] Japan ................................. 8-236059
Feb. 28, 1997 [JP] Japan ................................. 9-045053

[51] Int. Cl.[7] .................................................. A01K 87/04
[52] U.S. Cl. .................................................... 43/24
[58] Field of Search ...................... 43/18.1, 24

[56] References Cited

U.S. PATENT DOCUMENTS

| D. 108,720 | 3/1938 | Morgan ....................... 43/24 X |
| D. 369,645 | 5/1996 | Park ............................ D22/142 |
| D. 370,249 | 5/1996 | Park ............................ D22/142 |
| D. 370,519 | 6/1996 | Kug ............................. D22/142 |
| 1,409,282 | 3/1922 | Condley ....................... 43/24 |
| 2,324,429 | 7/1943 | Rondelli ....................... 43/24 |
| 2,777,239 | 1/1957 | Cushman ..................... 43/18.1 |
| 2,895,251 | 7/1959 | Karry ........................... 43/24 |
| 3,222,811 | 12/1965 | Henson ....................... 43/18.1 |
| 3,432,958 | 3/1969 | Bellinger ...................... 43/18.1 |
| 3,862,509 | 1/1975 | Petersen, Jr. ................. 43/18.1 |
| 4,043,070 | 8/1977 | Lamothe ...................... 43/18.1 |
| 4,130,960 | 12/1978 | Fontenot ...................... 43/18.1 |
| 4,183,163 | 1/1980 | Reimer ........................ 43/18.1 |
| 4,334,379 | 6/1982 | Nelli ............................ 43/24 |
| 4,541,197 | 9/1985 | LaRoue ....................... 43/18.1 |
| 4,547,991 | 10/1985 | Searcy ......................... 43/18.1 |
| 4,888,906 | 12/1989 | Yamato ........................ 43/24 |
| 5,040,323 | 8/1991 | Hughes, Jr. .................. 43/18.1 |
| 5,159,776 | 11/1992 | Horton et al. ................ 43/24 |
| 5,283,973 | 2/1994 | Oyama ......................... 43/24 |
| 5,299,377 | 4/1994 | Akiba .......................... 43/18.1 |
| 5,347,743 | 9/1994 | Tokuda et al. ............... 43/24 |
| 5,381,619 | 1/1995 | Watkins ....................... 43/18.1 |
| 5,406,736 | 4/1995 | Park ............................ 43/18.1 |
| 5,456,038 | 10/1995 | Park ............................ 43/18.1 |
| 5,479,740 | 1/1996 | Akiba et al. ................. 43/18.1 |
| 5,488,797 | 2/1996 | Akiba .......................... 43/18.1 |

FOREIGN PATENT DOCUMENTS

| 32-10592 | 9/1957 | Japan . |
| 37-15468 | 6/1961 | Japan . |
| 505944 | 7/1979 | Japan . |
| 61-60676 | 4/1986 | Japan . |
| 4-100377 | 8/1992 | Japan . |
| 4-248945 | 9/1992 | Japan . |
| 1259820 | 1/1972 | United Kingdom ............ 43/24 |

OTHER PUBLICATIONS

Fuji Tackle catalog, Jan. 1994, pp. 1–8.

*Primary Examiner*—Robert P. Swiatek
*Attorney, Agent, or Firm*—Shinjyu An Intellectual Property Frim

[57] ABSTRACT

A fishing line introduction guide, which guides a fishing line from a reel into an internal passage of a pass-through fishing rod. The fishing line introduction guide is mounted above a line introduction port connecting the inner passage of the fishing rod, and includes front and rear fastening elements, a connecting element, and an intermediate support portion. The front and rear fastening elements are fixed to an outer circumferential surface of the pass-through fishing rod. The connecting element is formed integrally with the front and rear fastening elements, and includes a first guide portion and an intermediate support portion. The intermediate support portion includes a second guide portion. The fishing line extends from the reel, through the first guide portion, the second guide portion, and into the line introduction port.

15 Claims, 7 Drawing Sheets

LINE INTRODUCTION GUIDE FOR PASS-THROUGH FISHING ROD

BACKGROUND OF THE INVENTION

1. Field of the Invention

The present invention relates to a line introduction guide for a pass-through fishing rod, and more particularly to a line introduction guide mounted on a fishing rod member having an internal passage therethrough and through which a fishing line is caused to pass, for guiding the fishing line from a fishing reel into a fishing line introduction port.

2. Description of the Related Art

A typical pass-through fishing rod has a line introduction port, an internal passage through the interior of the fishing rod, and an opening in the rod tip. The fishing line extends from a reel near the rod grip, through the line introduction port and internal passage, and out through the opening in the rod tip.

One type of pass-through fishing rod is shown in Japanese Published Patent Application No. 8-107739, and includes a line introduction guide. This line introduction guide includes front and rear fastening elements which are respectively formed at the front and rear ends thereof. These fastening elements are attached to the fishing rod at two points on either side of the line introduction port. An arch-shaped connecting element connects the front and rear fastening elements, and a guide element is formed in the connecting element. The guide element guides the fishing line from the reel into the line introduction port, so that the fishing line can be passed through the internal passage of the pass-through fishing rod.

The mechanical strength of this line introduction guide is high because it is fixed at two points along the length of the fishing rod. Furthermore, there is a reduced possibility that the guide element may be deformed as the result of an accident, because the guide element is formed in the connecting element. This is especially true when this type of fishing rod is compared with a standard fishing rod (non-pass-through) which has a plurality of ring-shaped guide elements projecting from its outer circumferential surface. Moreover, because the connecting element is formed into an arch shape, it is possible to reduce the possibility that the fishing line becomes tangled when there is too much slack therein.

FIG. 4 of the above-described prior art publication also shows another type of line introduction guide. An arch-like intermediate support portion has a second guide element formed therein. One end of the intermediate support portion is fixed to the connecting element, and the other end is fixed to the fishing rod at a point in between the front and rear fastening elements of the connecting element. The mechanical strength of this line introduction guide is further enhanced because of this configuration. However, because one end of the intermediate support portion must be fixed to the fishing rod, it increases the complexity of the structure and increases the overall weight.

SUMMARY OF THE INVENTION

An object of the present invention is to provide a fishing line introduction guide which is simple in structure and light in weight.

Another object of the present invention is to provide a fishing line introduction guide having an arch-like connecting element in which the mechanical strength thereof is not degraded.

Yet another object of the invention is to reduce the possibility that the fishing line becomes tangled.

According to one embodiment of the invention, a line introduction guide for a pass-through fishing rod is adapted to be mounted on a pass-through fishing rod having an internal passage and a line introduction port through which a fishing line is passed. The line introduction guide guides the fishing line from a reel to the line introduction port, and includes front and rear fastening elements respectively formed at the front and rear ends of the line introduction guide, and a connecting element which extends above the line introduction port and connects the front and rear fastening elements. The front and rear fastening elements are respectively fastened to an outer circumferential surface of the pass-through fishing rod.

The connecting element is formed of metal and includes a first guide portion through which the fishing line may pass. The connecting element also includes an opening formed therein, the opening disposed at a point opposite the line introduction port.

An intermediate support portion is fixed at one end to the connecting element, at a point forward of the first guide portion and extending toward the pass-through fishing rod. The intermediate support portion includes a second guide portion which guides the fishing line from the first guide portion to the line introduction port. The intermediate support portion is formed by bending a portion of a rear edge of the opening in the connecting element down toward the pass-through fishing rod.

Both the first guide portion and the second guide portions include through-holes. The inner diameter of the through-hole in the second guide portion is smaller than the through-hole in the first guide portion. The plane of the through-hole in the second guide portion is generally perpendicular with respect to the pass-through fishing rod, and the plane of the through-hole in the first guide portion is generally inclined with respect to the pass-through fishing rod.

The connecting element further includes a portion which is concave with respect to the pass-through fishing rod and is disposed opposite the line introduction port, a portion which is convex with respect to the pass-through fishing rod and disposed adjacent to the concave portion, and a portion which is inclined toward the pass-through fishing rod and disposed adjacent to the convex portion. The first guide portion is formed in the inclined portion, and the opening is formed in the concave portion.

The connecting element also includes two reinforcement ribs, the reinforcement ribs formed by bending at least part of both side portions of the connecting element down toward the pass-through fishing rod.

The front and rear fastening elements are fastened to the outer circumferential surface of the pass-through fishing rod by winding a thread-like material around the front and rear fastening elements and the pass-through fishing rod.

According to second embodiment of the invention, a line introduction guide for a pass-through fishing rod is adapted to be mounted on a pass-through fishing rod having an internal passage and a line introduction port through which a fishing line is passed. The line introduction guide guides the fishing line from a reel to the line introduction port, and includes front and rear fastening elements respectively formed at the front and rear ends of the line introduction guide, and a connecting element which extends above the line introduction port and connects the front and rear fastening elements. The front and rear fastening elements are respectively fastened to an outer circumferential surface of the pass-through fishing rod.

The connecting element is formed of metal and includes a guide portion through which the fishing line may pass. The connecting element also includes an opening formed therein, the opening disposed at a point opposite the line introduction port. The connecting element also includes two reinforcement ribs formed by bending at least part of both side portions of the connecting element down toward the pass-through fishing rod. The connecting element is also formed integrally with the front and rear fastening elements.

The connecting element includes a portion which is concave with respect to the pass-through fishing rod and is disposed opposite the line introduction port, a portion which is convex with respect to the pass-through fishing rod and disposed adjacent to the concave portion, and a portion which is inclined toward the pass-through fishing rod and disposed adjacent to the convex portion. The reinforcement ribs are disposed between the convex portion and the inclined portion.

The guide portion is formed in the inclined portion, and the opening is formed in the concave portion. The width of the convex portion of the connecting element gradually narrows between a point where the guide portion is formed and a point where the opening is formed. The width of the front and rear fastening elements is narrower than the width of the connecting element.

The front and rear fastening elements are formed integrally with the connecting element, and the portions of the line introduction guide between the front and rear fastening elements and the connecting element are concave with respect to the pass-through fishing rod.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

First Embodiment

Figure 1:
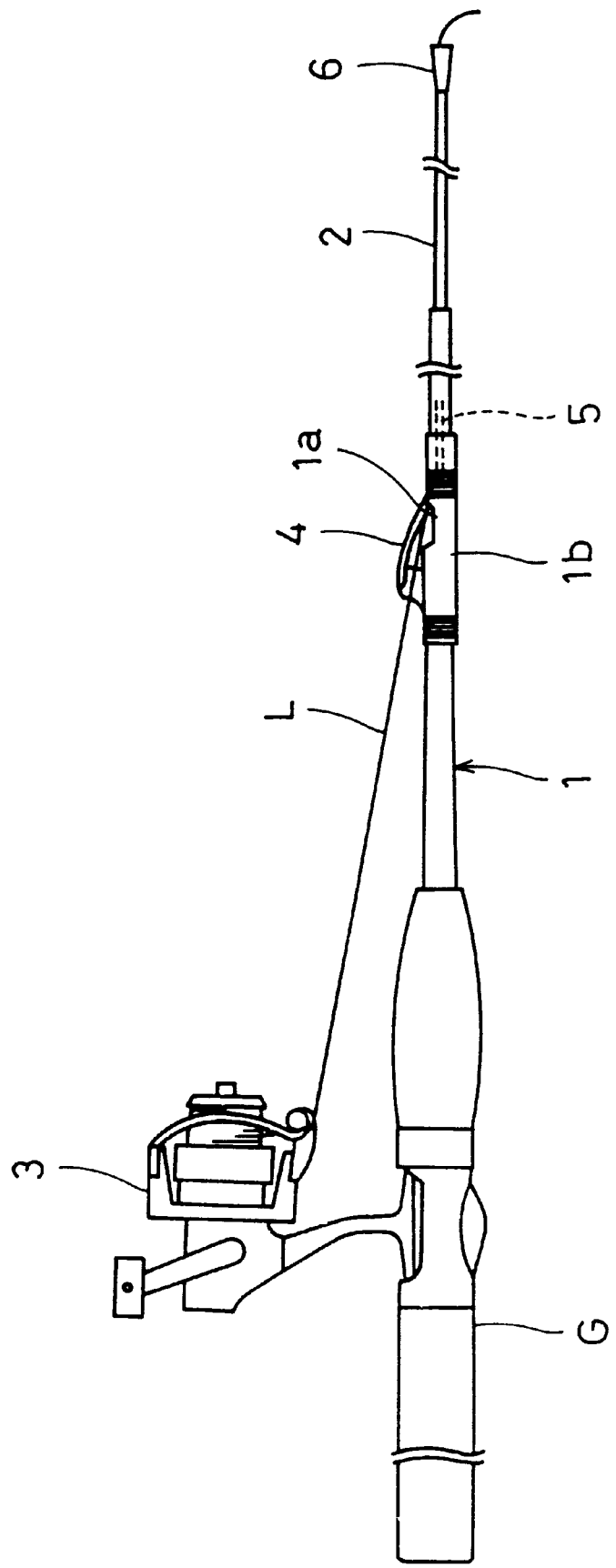
FIG. 1 is a side elevational view showing a pass-through fishing rod according to a first embodiment of the invention.

FIG. 1 shows a pass-through fishing rod according to a first embodiment of the present invention. The rod includes a tapered tubular base section 1 and a tapered tubular tip section 2, with the tip end of the base section 1 removeably connected to the butt end of the tip section 2. A fishing line introduction port 1a is formed at a front end portion of the base section 1. Reinforced portions 1b are formed around the vicinity of the fishing line introduction port 1a. This reinforced portion 1b has thicker walls than the base section 1, and serves to prevent the bending strength of the pass-through fishing rod from being lowered due to the existence of the fishing line introduction port 1a.

A reel 3 may be mounted between grips G on the rear portion of the base section 1. A fishing line introduction guide 4 is mounted on top of the line introduction port 1a, and serves to guide a fishing line L from the reel 3 into the fishing line introduction port 1a. The fishing line L passes through an inner passage 5 of the rod, and is discharged from the rod through a top guide 6 mounted on the tip end of the tip section 2.

Figure 2:
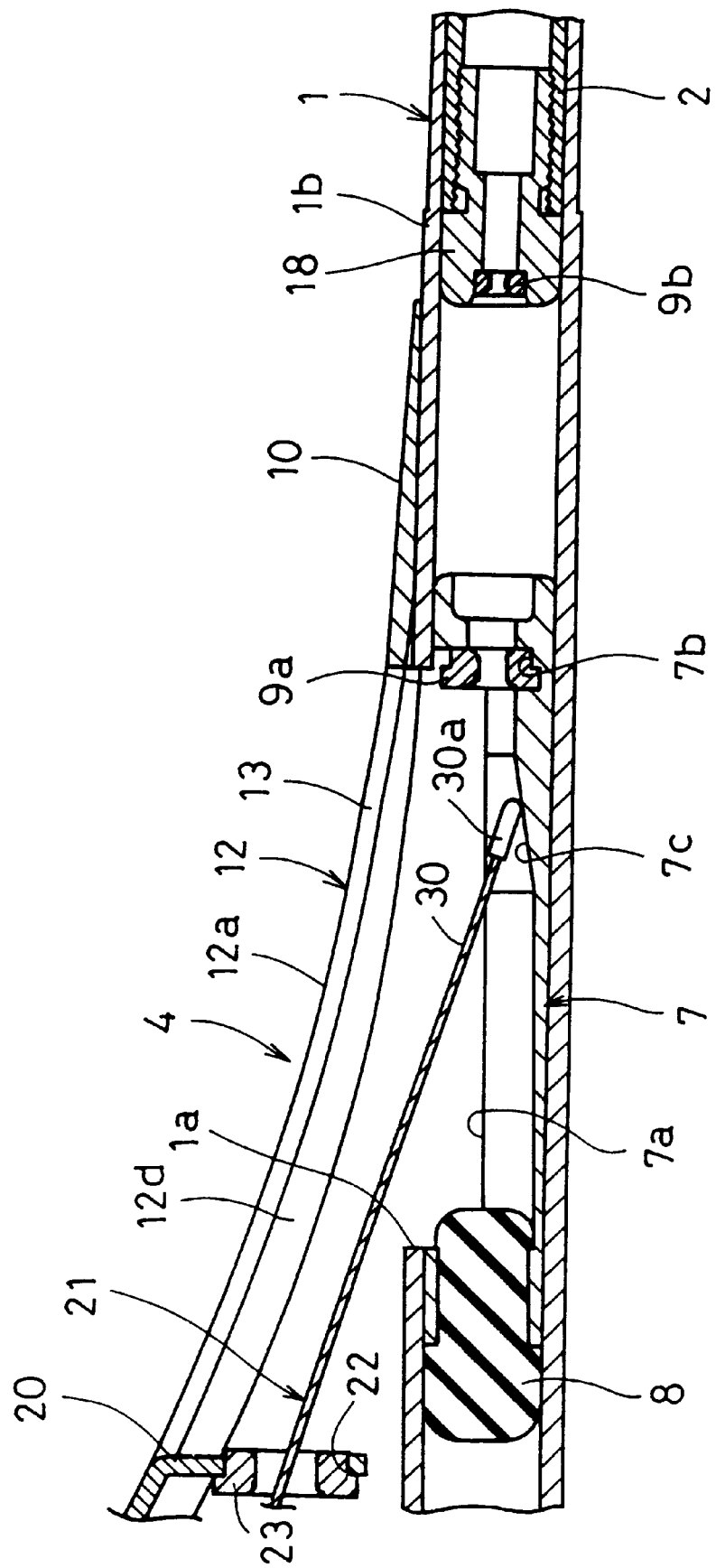
FIG. 2 is an enlarged cross-sectional view of the pass-through fishing rod shown in FIG. 1.

As shown in FIG. 2, a guide sleeve 7 is fitted into the interior of the base section 1 where the fishing line introduction port 1a is formed. The guide sleeve 7 is a cylindrical member made of synthetic resin, and is sealed at its rear end by a water stopping plug 8 made of an elastic material. An opening 7a is formed in a circumferential surface of the guide sleeve 7 facing the fishing line introduction port 1a. A ring mounting groove 7b is formed in the front portion of the guide sleeve 7. A ring 9a is mounted in the groove 7b, and is formed from a ceramic material or the like. An inner wall of the guide sleeve 7 has a tapered surface 7c tapered toward the ring mounting groove 7b, so that a tip end 30a of a fishing line passing jig 30 (used to pass the fishing line through the interior of the fishing rod) may be readily guided into the ring 9a.

A back plug 18 is detachably mounted in the rear end of the tip section 2. A ring 9b is fitted in the rear end of the back plug 18.

Figure 3:
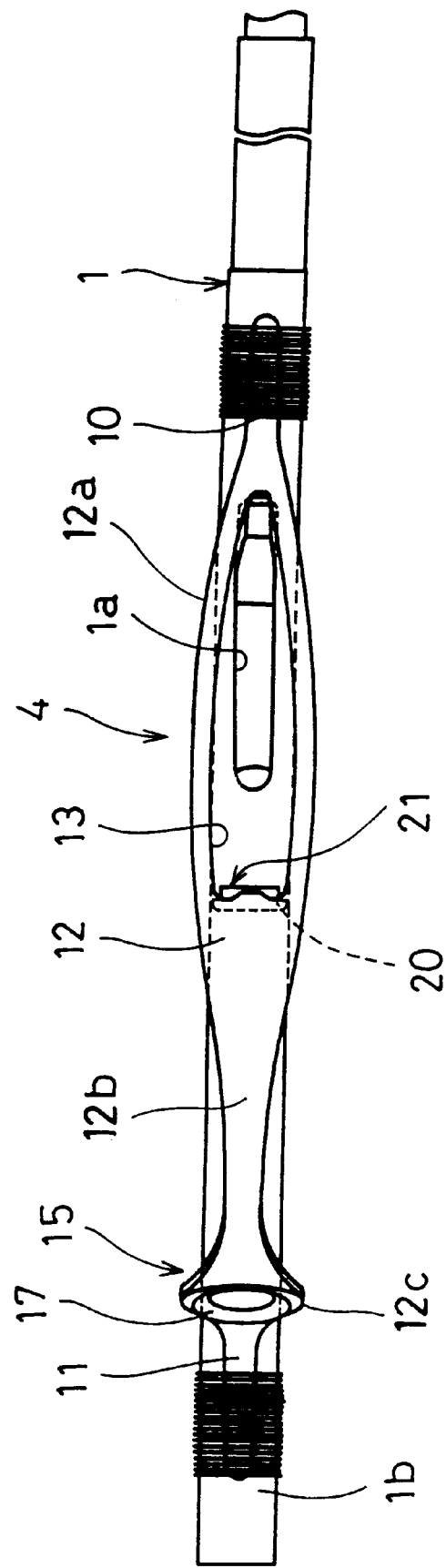
FIG. 3 is an enlarged plan view of the fishing line introduction guide shown in FIG. 1.
Figure 4A:
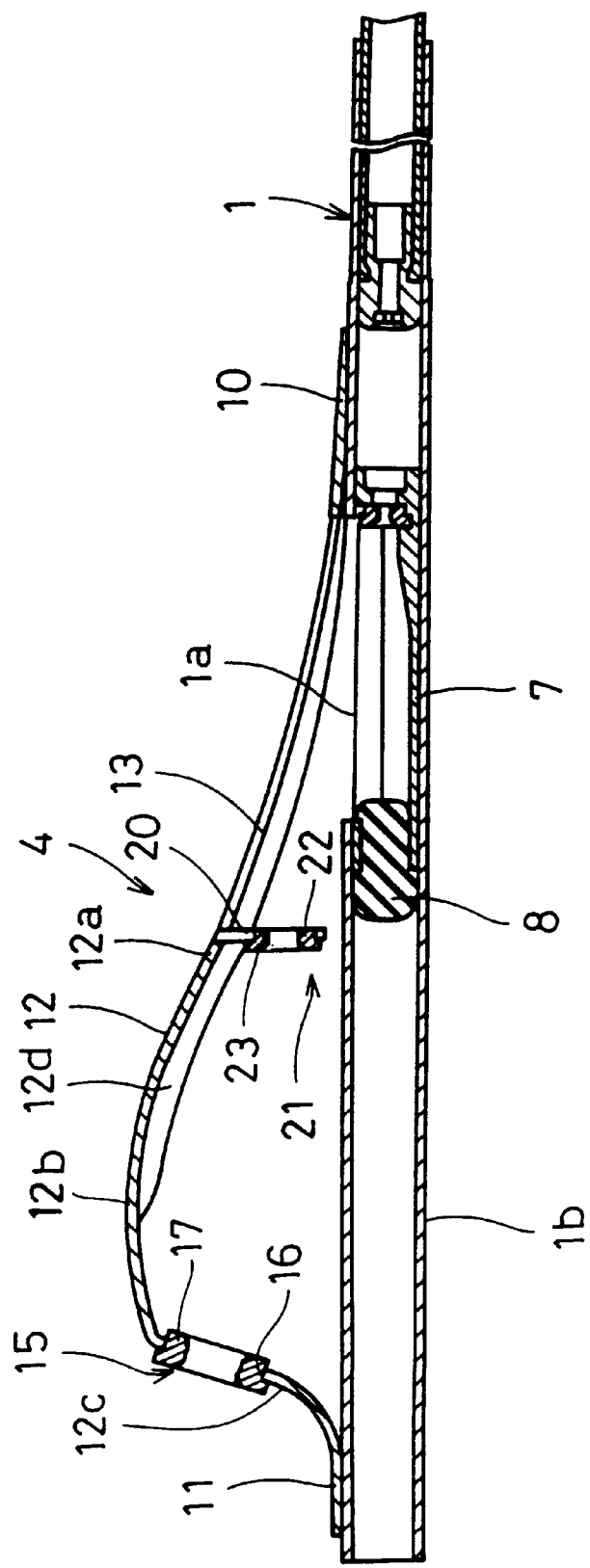
FIG. 4a is an enlarged cross-sectional view of the pass-through fishing rod and fishing line introduction guide shown in FIG. 1.
Figure 4B:
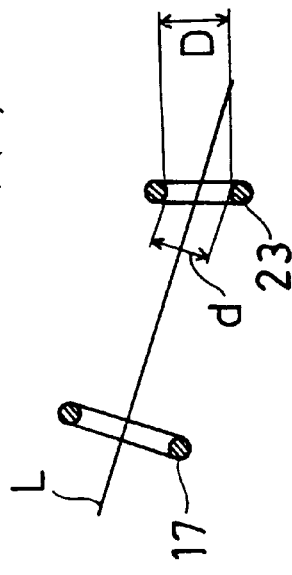
FIG. 4b is an enlarged cross-sectional view of a portion of the fishing line guide members for the fishing line introduction guide shown in FIG. 1, showing the geometric relationships between the fishing line guide members and the fishing line.
Figure 5:
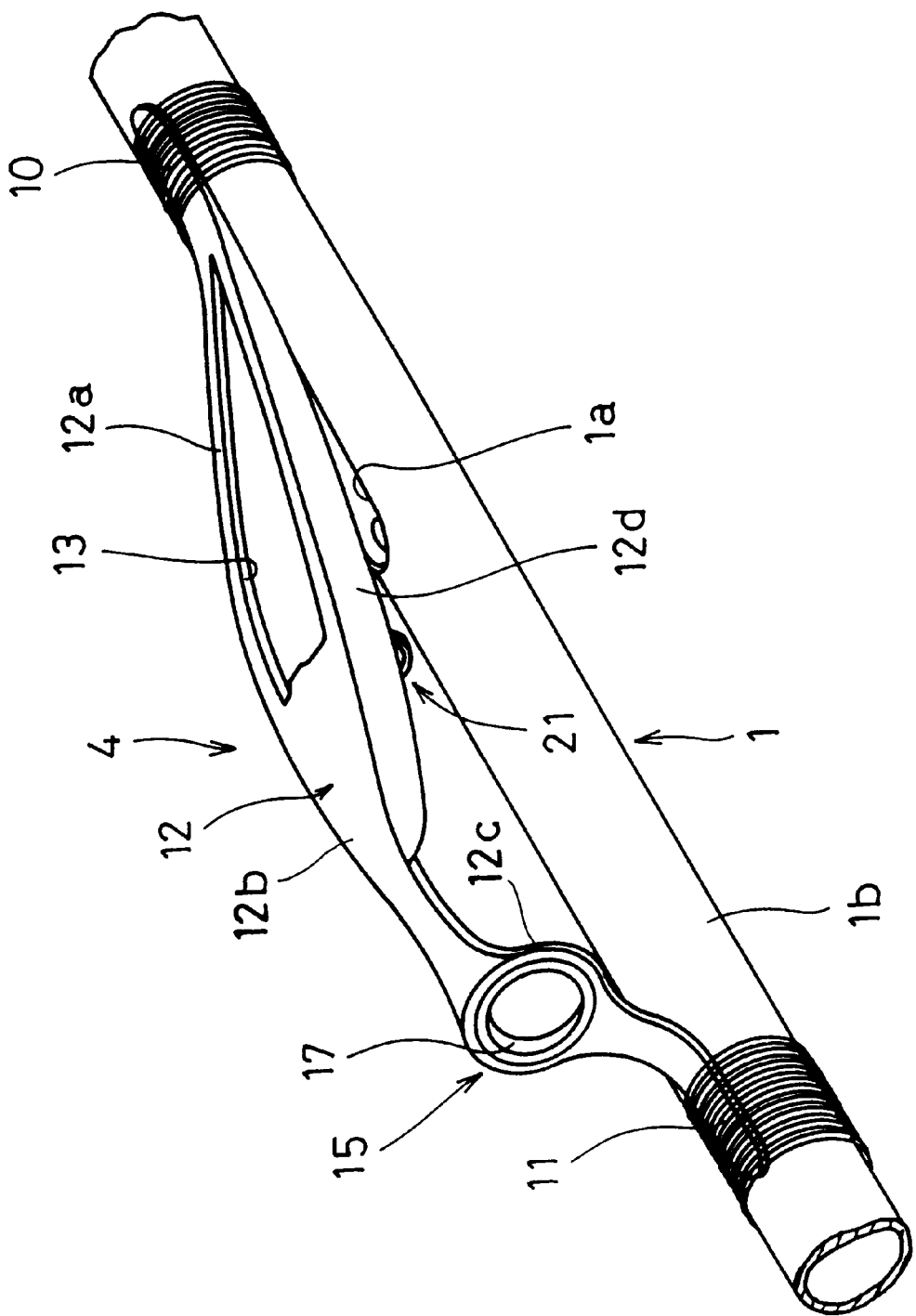
FIG. 5 is a perspective view of the fishing line introduction guide shown in FIG. 1.

As shown in FIGS. 3 to 5, the fishing line introduction guide 4 has a tongue-like front fastening element 10 formed at its front end portion, a tongue-like rear fastening element 11 formed at its rear end portion, and a connecting element 12 for connecting the front and rear fastening elements 10 and 11. The fishing line introduction guide 4 may be fixed to the base section 1 by winding a thread-like material around the fastening elements 10 and 11 and the pass-through fishing reel.

The connecting element 12 is formed into an arch-shape, and includes an concave portion 12a formed at a position facing the line introduction port 1a, a convex portion 12b formed to the rear of the curved portion 12a, and a concave portion 12c formed to the rear of the convex portion 12b. The front fastening element 10 is formed integrally with the concave portion 12a, the concave portion 12a is formed integrally with the convex portion 12b, and the inclined portion 12c is formed integrally with the rear fastening element 11. The fishing line introduction guide 4 may be formed from stainless steel or the like.

As shown in FIG. 3, the width of the front and rear fastening elements 10 and 11 is narrower than that of the other portions of the fishing line introduction guide 4. The width of the concave portion 12a becomes gradually wider toward the rear of the fishing rod, and the width of the convex portion 12b becomes gradually narrower toward the rear of the fishing rod. An opening 13 is formed in the concave portion 12a, and is positioned such that it generally faces the line introduction port 1a when the line introduction guide 4 is attached to the fishing rod.

As can be seen from FIGS. 4a, 4b and 5, reinforcement ribs 12d are formed on both sides of the wide width portion of the connecting element 12. The reinforcement ribs 12d serve to enhance the rigidity of the connecting element 12, and are formed by bending a portion of both sides of the connecting element 12 down toward the fishing rod. These reinforcement ribs 12d provide extra strength to the line introduction guide 4 in the event that something collides it.

A first guide portion 15 is formed in the inclined portion 12c, and includes a through-hole 16 and a ring 17 formed from ceramic material or the like. A second guide portion 21 is formed in an intermediate support portion 20, with the intermediate support portion 20 being formed by bending a portion of the rear edge of the opening 13 downward. The second guide portion 21 includes a through-hole 22 formed in the intermediate support portion 20, and a ring 23 made of ceramic or the like. The inner diameter of the ring 23 is smaller than that of the ring 17.

The intermediate support portion 20 is formed to be substantially perpendicular to the axis of the base section 1. As can be seen in FIG. 4b, this results in the angle formed between the face of the second guide portion 21 and the fishing line L being different than the angle formed between the face of the first guide portion 15 and the fishing line L. Because the tip of the intermediate support portion 20 is not fixed, it can move freely even when the pass-through fishing rod is flexed, and thus the rigidity of the pass-through fishing rod is not increased. In addition, because the tip end of the intermediate support portion 20 is not fixed, it simplifies the structure and allows a reduction in the overall weight of the pass through fishing rod.

As can be partially seen in FIG. 2, the fishing line is paid out from the reel 3 and attached to the fishing line passing jig 30, and the tip end 30a of the fishing line passing jig 30 is caused to pass through the first and second guides 15 and 21. Thereafter, the fishing line is introduced into the fishing line introduction port 1a. Because the guide sleeve 7 is fitted into the interior of the base section 1, and the taper surface 7c is provided in the guide sleeve 7, the tip end 30a of the fishing line passing jig 30 is passed through the ring 9a. The fishing line passing jig 30 is discharged from the top guide 6 of the tip section 2 and thereby leads the fishing line L through the inner passage 5 of the fishing rod.

A pass-through fishing rod configured in this manner has a number of advantages over those in the prior art:

(a) Because the front and rear fastening elements 10 and 11 and the connecting element 12 are formed integrally from a single piece of metal, it is possible to enhance the mechanical strength thereof and to reduce the possibility that the fishing line would become tangled;

(b) Because the opening 13 is disposed above the line introduction port 1a, it is possible for a fisherman to observe the fishing line introduction port 1a from above, and allows him or her to easily introduce the tip end 30a of the fishing line passing jig 30 into or out of the line introduction port 1a;

(c) Because the intermediate support portion 20 is formed by bending a rear edge portion of the opening 13 downward toward the pass-through fishing rod, it is possible to easily form the intermediate support portion 20 and the opening 13 by metal punching;

(d) Because the first guide portion 15 is more inclined than the first guide portion 15 (as shown in FIG. 4b), the apparent diameter d of the second guide portion 21 is smaller than the actual diameter D. In addition, because the actual inner diameter of the ring 23 is smaller than the inner diameter of the ring 17, any twists in the fishing line L will be removed as it is introduced into the fishing line introduction port 1a. Accordingly, there is little fear that the fishing line L will become tangled;

(e) Because the connecting element 12 is formed in an arch shape which is both concave and convex, it is possible to maintain the mechanical strength of the connecting element 12; and (f) Because the convex portion 12b is relatively strong against an outside force, it may be gradually narrowed in order to reduce the possibility that the fishing line will become tangled, as well as reduce the overall weight of the line introduction guide 4.

Second Embodiment

Figure 6:
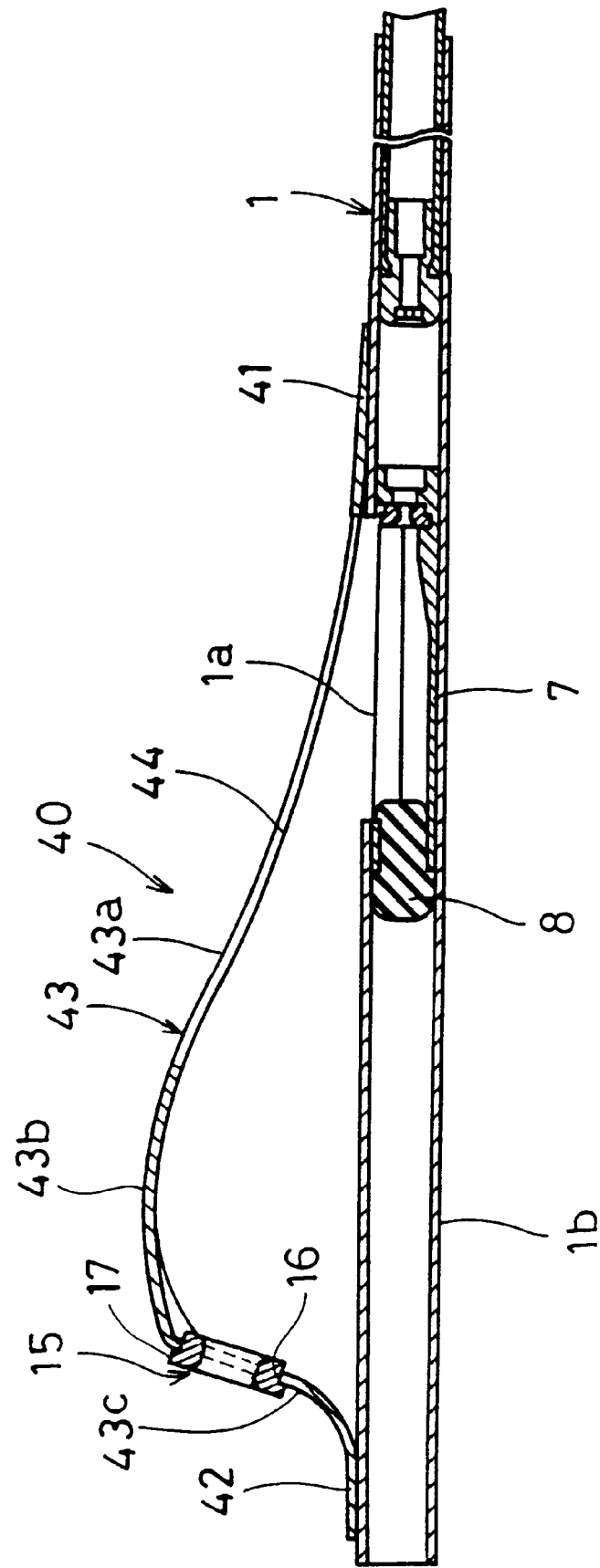
FIG. 6 is a cross-sectional view of a fishing line introduction guide according to a second embodiment of the invention.
Figure 7:
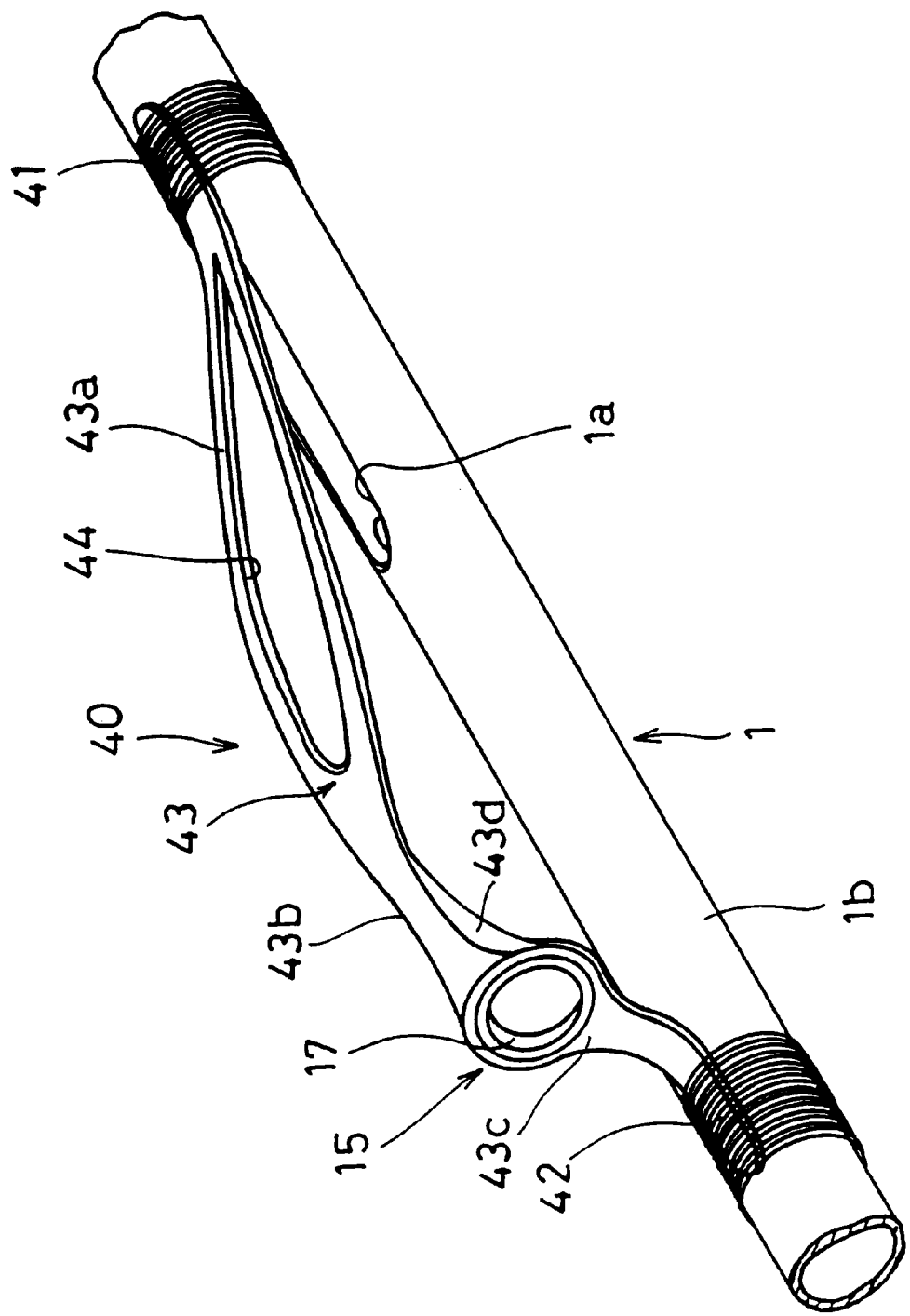
FIG. 7 is a perspective view of the fishing line introduction guide shown in FIG. 6.

FIGS. 6 and 7 show a pass-through fishing rod having a fishing line introduction guide 40 in accordance with a second embodiment of the invention.

The fishing line introduction guide 40 includes a front fastening element 41 formed at the front end portion thereof, a rear fastening element 42 formed at the rear end portion thereof, and an arch-shaped connecting element 43 which connecting the front and rear fastening elements 41 and 42. The connecting element 43 has an concave portion 43a formed integrally with the front fastening element 41, an convex portion 43b formed integrally with the concave portion 43a, and an inclined portion 43c formed integrally with the convex portion 43b and the rear fastening element 42.

An opening 44 is formed in the concave portion 43a, and a guide portion 15 is formed in the inclined portion 43c. The structure of the guide portion 15 is the same as the first embodiment. Reinforcement ribs 43d are disposed between the convex portion 43b and the inclined portion 43c, and are formed by bending a portion of both sides of the connecting element 43 down toward the pass-through fishing rod. In this embodiment, the intermediate support portion 20 and the second guide portion 21 in the first embodiment are not provided.

As with the first embodiment, the width of the front and rear fastening elements 41 and 42 is smaller than that of the connecting element 43. Furthermore, the width of the convex portion 43b is narrower than that of the other portions of the connecting element 43. In addition, the fishing line introduction guide 40 is fixed to the base section 1 in the same manner and position as that of the first embodiment.

In this embodiment, the convex portion 43b is the point where the fishing line is most likely to be tangled when there is excessive slack in the fishing line. Therefore, this portion is narrower, so as to reduce the possibility that the fishing line will becomes tangled. In addition, the reinforcement ribs 43d are formed at the portion where the convex portion 43d is narrower, which further reduces the possibility that the fishing line will become tangled.

Other embodiments (a) The present invention may be applied to any type fishing rod and is not limited to a specific type, such as a linear joint type for lure fishing.

(b) The fishing line introduction guide is not limited to ones which are formed from metal plates, but may be formed from synthetic resin or the like.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A line introduction guide mounted on a pass-through fishing rod having an outer circumferential surface and an internal passage with a line introduction port through which a fishing line is passed, and to guide said fishing line from a reel to said line introduction port of said internal passage, said line introduction guide comprising:

(a) front and rear fastening elements which are respectively formed at front and rear ends of said line introduction guide, said front and rear fastening elements respectively fastened to an outer circumferential surface of said pass-through fishing rod;

(b) a connecting element which connects said front and rear fastening elements, said connecting element extending above said line introduction port and having a first guide portion formed therein through which said fishing line from said reel may pass; and (c) an intermediate support portion fixed at one end to said connecting element at a point forward of said first guide portion and extending toward said pass-through fishing rod, said intermediate support portion having a second guide portion formed therein for guiding said fishing line from said first guide portion to said line introduction port.

2. The line introduction guide according to claim 1, wherein said connecting element is formed from metal and formed integrally with said front and rear fastening elements.

3. The line introduction guide according to claim 2, wherein said connecting element includes an opening formed therein, said opening disposed at a point opposite said line introduction port.

4. The line introduction guide according to claim 3, wherein said intermediate support portion is formed by bending a portion of a rear edge of said opening in said connecting element down toward said pass-through fishing rod.

5. The line introduction guide according to claim 4, wherein both said first guide portion and said second guide portions include through-holes, and an inner diameter of said through-hole in said second guide portion is smaller than said through-hole in said first guide portion.

6. The line introduction guide according to claim 5, wherein the plane of said through-hole in said second guide portion is generally perpendicular with respect to said pass-through fishing rod, and the plane of said through-hole in said first guide portion is generally inclined with respect to said pass-through fishing rod.

7. The line introduction guide according to claim 6, wherein said connecting element includes a portion which is concave with respect to said pass-through fishing rod and is disposed opposite said line introduction port, a portion which is convex with respect to said pass-through fishing rod and disposed adjacent to said concave portion, and a portion which is inclined toward said pass-through fishing rod and disposed adjacent to said convex portion; and said first guide portion is formed in said inclined portion, and said opening is formed in said concave portion.

8. The line introduction guide according to claim 7, wherein said connecting element includes two reinforcement ribs, said reinforcement ribs formed by bending at least part of both side portions of said connecting element down toward said pass-through fishing rod.

9. The line introduction guide according to claim 8, wherein said front and rear fastening elements are fastened to said outer circumferential surface of said pass-through fishing rod by winding a thread-like material around said front and rear fastening elements and said pass-through fishing rod.

10. A line introduction guide mounted on a pass-through fishing rod having an outer circumferential surface and an internal passage with a line introduction port through which a fishing line is passed, and to guide said fishing line from a reel to said line introduction port of said internal passage, said line introduction guide comprising:

(a) front and rear fastening elements which are respectively formed at front and rear ends of said line introduction guide, said front and rear fastening elements respectively fastened to an outer circumferential surface of said pass-through fishing rod;

(b) a connecting element which connects said front and rear fastening elements, said connecting element extending above said line introduction port and having a guide portion formed therein through which said fishing line from said reel may pass, said connecting element including two reinforcement ribs formed by bending at least part of both side portions of said connecting element down toward said pass-through fishing rod.

11. The line introduction guide according to claim 10, wherein said connecting element is formed from metal and formed integrally with said front and rear fastening elements.

12. The line introduction guide according to claim 11, wherein said connecting element includes a portion which is concave with respect to said pass-through fishing rod and is disposed opposite said line introduction port, a portion which is convex with respect to said pass-through fishing rod and disposed adjacent to said concave portion, and a portion which is inclined toward said pass-through fishing rod and disposed adjacent to said convex portion; and said reinforcement ribs are disposed between said convex portion and said inclined portion.

13. The line introduction guide according to claim 12, wherein said connecting element includes an opening formed therein, said opening disposed at a point opposite said line introduction port.

14. The line introduction guide according to claim 13, wherein said guide portion is formed in said inclined portion, and said opening is formed in said concave portion; and a width of said convex portion of said connecting element gradually narrows between a point where said guide portion is formed and a point where said opening is formed.

15. The line introduction guide according to claim 14, wherein the width of said front and rear fastening elements is narrower than the width of said connecting element; and the portions of said line introduction guide between said front and rear fastening elements and said connecting element are concave with respect to said pass-through fishing rod.

* * * * *